May 11, 1937.  J. K. DELANO  2,079,989
GEAR CASE CLEANING APPARATUS
Filed Feb. 9, 1934  2 Sheets-Sheet 1
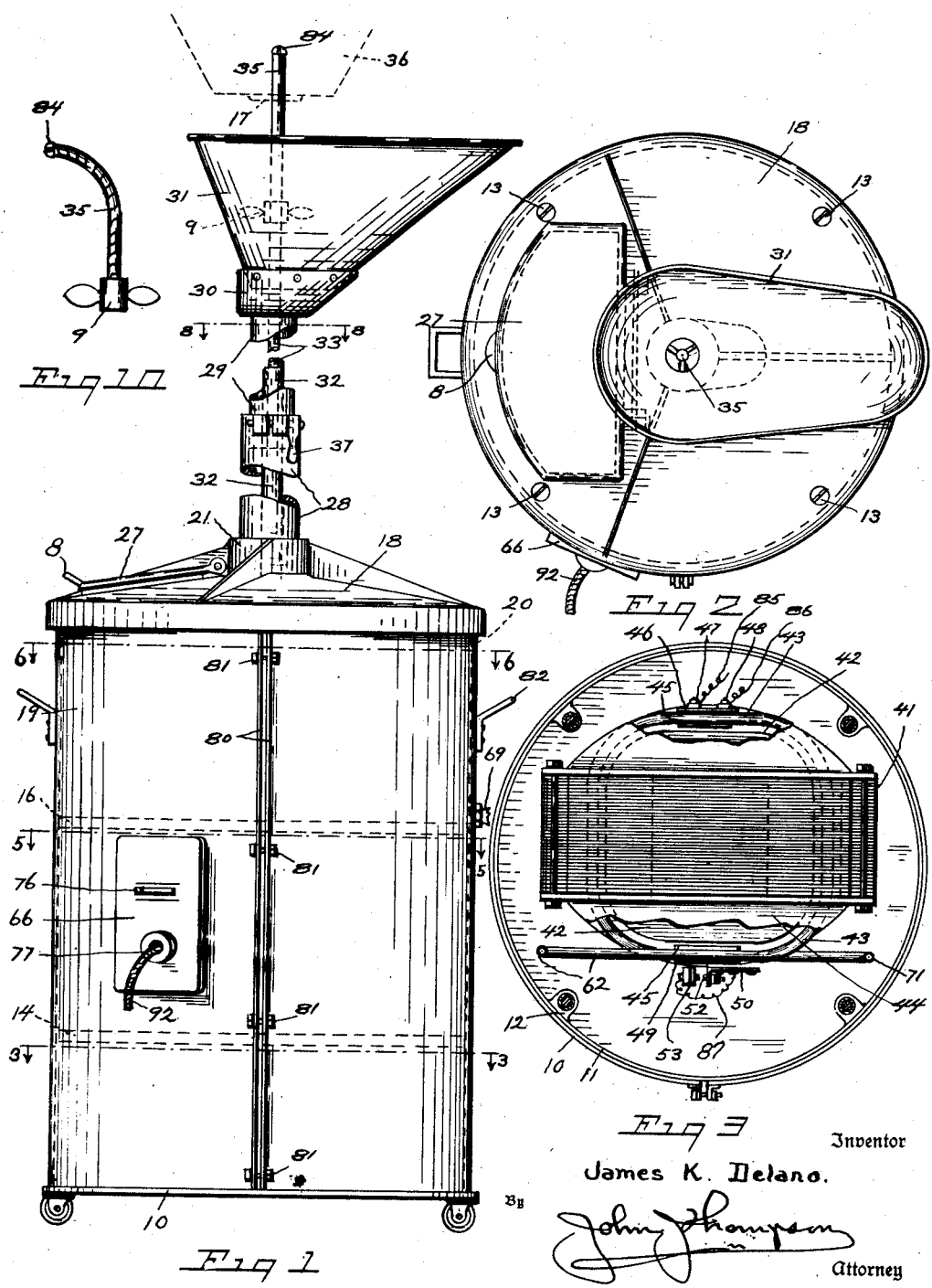
Inventor
James K. Delano.
By John Thompson
Attorney May 11, 1937. J. K. DELANO 2,079,989
GEAR CASE CLEANING APPARATUS
Filed Feb. 9, 1934 2 Sheets-Sheet 2
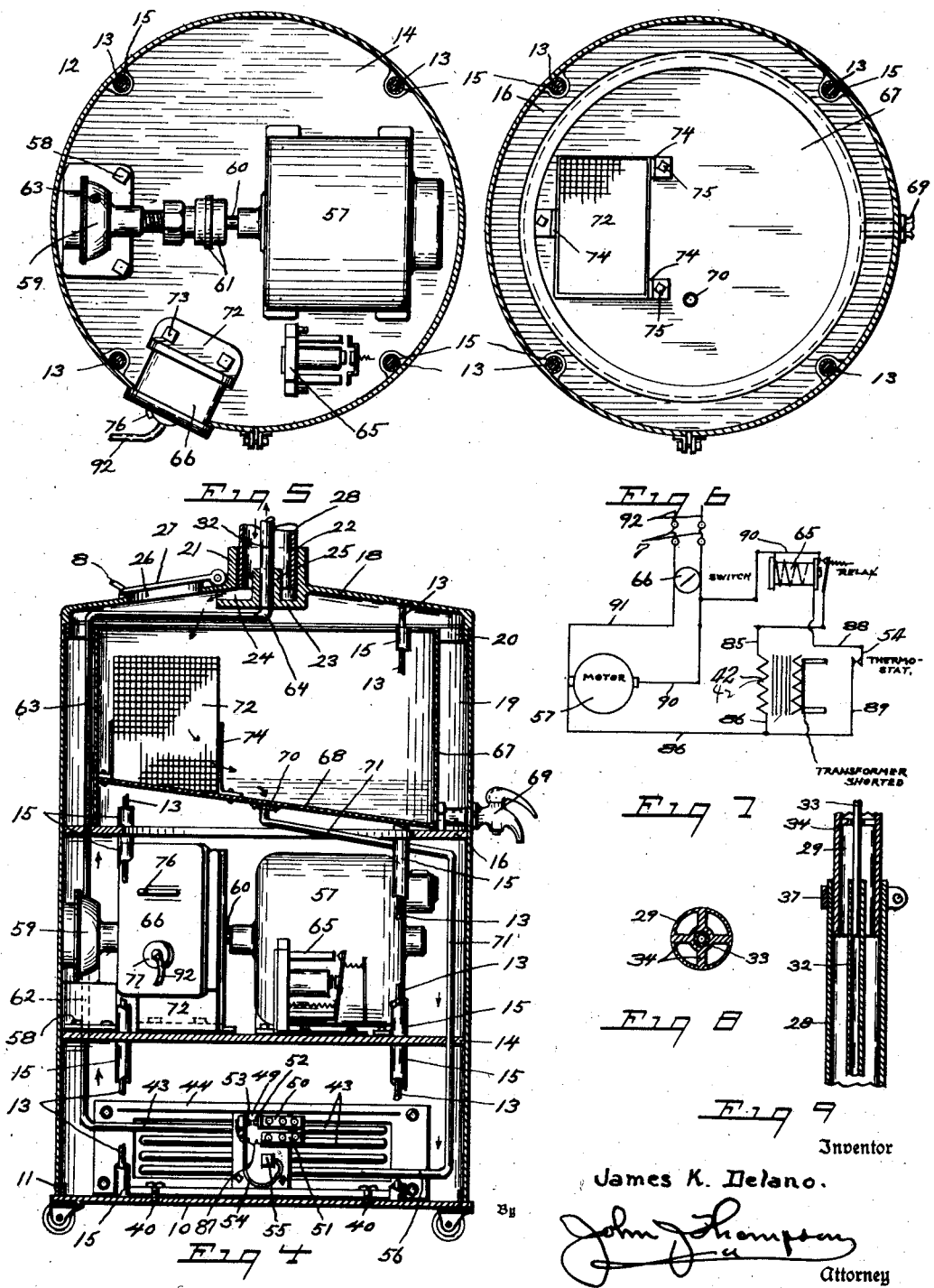
Inventor
James K. Delano.
Attorney Patented May 11, 1937

2,079,989

UNITED STATES PATENT OFFICE 2,079,989

GEAR-CASE CLEANING APPARATUS

James K. Delano, New York, N. Y.

Application February 9, 1934, Serial No. 710,503

7 Claims. (Cl. 184—1.5)

This invention relates to a method and apparatus for cleaning and flushing the interior of gear, transmission, differential, and crank-cases of automobiles and the like, and the invention relates more particularly to a method and device for softening and removing hard thick lubricating oil and grease from such casings, or wherever gears are run in an oil or grease bath.

It is the general practice in the lubrication of certain parts of the automobile, such as the transmission, differential, steering gear, etc., to use a high viscosity or thick grease for the summer months and to change to a lighter oil or grease for the winter months.

The thicker summer lubricant is unsuited for the colder weather as it makes gear shifting difficult and does not flow readily, thus not properly protecting the gearing, also the thinner lubricant used during the winter becomes too fluid during the warm weather and cannot be retained properly in the gear housings and will escape through the packing glands into the brakes, clutch, etc., hence the use of two lubricants of different viscosities.

The average motorist does not usually take the trouble to have his lubricant changed until the need of the change is brought to his attention by the difficulty of gear shifting; noise in the rear end, etc., or other symptoms which indicate a change of lubricant is required.

The attendant at the service station removes the drain plug in the gear casing, and it is a long tedious wait for the thickened lubricant to drain out and usually it is only partly drained out, and when the new lubricant is added the trouble is only partially removed as the resultant mixture is not correct.

It is with the idea of cleaning out the gear housings quickly and thoroughly, removing every particle of the lubricant, not only from the housing or casing, but from the gearing, bearings and all interior parts as well, that the apparatus described herein is particularly adapted, the new and novel features of which will be noted in the accompanying description.

I am aware that there are some devices for this purpose, which introduce a cleansing fluid into the gear casing from the top, and which require that the floor boards of the automobile must first be removed to provide access to the top or cover plate of the transmission. When the casing is treated in this manner, the cleansing fluid which is introduced into the casing from the top or near the top will take the shortest path between its entrance and the drain hole at the bottom, and will not reach the grease or hard oil that has accumulated in the corners of the casing, so that all of the old lubricant will not be removed by such a method.

There are also methods and devices which require that the gear casing be of special design and construction and be equipped with special piping and spray nozzles that are built into the casing so that the cleansing fluid may be carried thereby, and travel by gravity and discharge through the drain hole, but such devices can not be used except with gear casing so equipped.

In some types of gear casings there is only one filler opening provided and that is on the side of the casing, so that there is no means whereby a liquid can be entered at the top of the casing and circulated within, without special nozzles built into the casing and the liquid can not be made to reach the upper parts of the interior, as the cleansing liquid will take the most direct path through the casing.

I have found that by injecting the cleansing liquid into the gear casing through the bottom or lower drain hole and under pressure, and in the form of a heavy spray or jet, that all of the corners and other parts of the interior of the casing will be reached and the old lubricant that has become coagulated due to low temperatures will be softened, liquefied and will be readily drained out.

It has also been the practice to heat the gear casing by injecting live steam, preheated air, etc., into the same before removing the old lubricant, but it has been found that any sudden heating of the casing is dangerous especially during zero weather and tends to cause sudden expansion of the parts and damage to bearings, etc. I have therefore devised means whereby the casing and its interior parts are gradually heated in an even manner and without any danger due to sudden temperature changes.

The operation of removing and changing the lubricant is generally accomplished while the automobile is over a pit or upon a lift. To accommodate the varying distances between the ground and the drain opening in the gear casing, I have provided my apparatus with a telescoping device which contains both the feed and drain pipes and which may be adjusted so as to bring the injection nozzle in proper relation with the casing, and so locked in position.

To prevent waste of the cleansing fluid and to utilize the old lubricant, I have provided means whereby as the old lubricant is liquefied it is carried to the supply tank and from there to a heating device where it is further liquefied and again injected into the casing to assist in the cleaning operation.

In Figure 10 of the drawings I have shown another type of nozzle member which is flexible and may be used where the drain opening is on the side of the gear casing or any other places where the straight nozzle member could not be employed.

Also the nozzles on the end of the nozzle members may be interchanged, and different types used for dividing the stream of hot oil into several jets, and as the oil pump delivers the heated oil at high pressure such a divided nozzle will deliver the oil to all parts of the interior of the casing.

These nozzles may be of different forms of construction, such as conical ends having crossed slots, spinners, and other means for dividing the oil into a series of jets, etc.

It is also to be noted that the injection means including the feed pipe and nozzle may be used without the telescoping stand if desired, as there may be cases where the stand can not be employed to advantage.

With these and other objects in view, my invention consists in certain novel construction and combination of parts that will hereinafter be fully described and claimed, and also illustrated in the accompanying drawings which form a part hereof and in which like figures of reference refer to corresponding parts in all of the views, and it is understood that slight changes may be made without departing from the spirit of the invention.

In the drawings:

Figure 1 shows a front elevation of the device, in position for cleaning and flushing a gear casing.

Figure 2 shows a top plan view of the device.

Figure 3 shows a horizontal sectional view, taken on the line 3—3 of Figure 1, and shows the electrically operated heating unit.

Figure 4 is a vertical sectional view of the device, showing the arrangement of the several parts.

Figure 5 is a horizontal sectional view of the device taken on the line 5—5 of Figure 1, and shows the pump, the motor, the relay and the switch.

Figure 6 is a horizontal sectional view taken on the line 6—6 of Figure 1, and shows the tank.

Figure 7 is a diagrammatic view, showing the electrical wiring circuit, the wires having been left off of the other views for clearness.

Figure 8 is a cross sectional view of the pipes 29 and 33, showing the spider.

Figure 9 is a vertical partial sectional view of the pipes 28, 29, 32 and 33 showing the method of telescoping the same.

Figure 10 shows another type of nozzle.

Referring to the drawings:

The apparatus as herewith shown and described comprises a framework composed of a base plate 10 circular in form but which may be of any desired shape, material and size and which is formed with an upturned flange 11 and the bosses 12, which are threaded to take the lower end of the stay rods 13, the upper ends of which are headed and countersunk into the top plate 18.

The interior of the apparatus is divided into three compartments by the deck 14 and the tank supporting ring 16 which are spaced apart by the tubular posts 15 which are placed upon the stay rods 13 between the top 18 and the ring 16, the ring 16 and the deck 14, and the deck 14 and the bottom plate 10. It is understood that in place of the castings shown for these parts, the same may be made of pressed metal or other suitable material.

The top plate 18, ring 16, deck 14 and bottom 10 are all enclosed by a sheet metal casing 19 which is formed with the vertical flanged edges 80 which are secured together by the bolts 81; said casing being provided with the handles 82 by which the apparatus may be moved upon the castors which are attached to the base 10.

The top plate 18 is formed with a depending flange 20 and a central boss 21, which is formed with the concentric upper opening 22 and a bottom plate 23 spaced therefrom to form a side opening or spout 24 and having a central boss 25; while near one side of said top plate 18 is provided a filler opening 26 covered by a lid 27 having a finger grip 8.

Within the central boss 21 of the top plate 18 is secured the lower end of a pipe 28 which telescopes with a pipe 29, to the upper end of which is attached a funnel 31 by a fitting 30. This funnel may be of a different form and size depending upon the location of the drain hole in the gear casing.

Within the tubular boss 25 of this top plate 18 is secured the lower end of a pipe 32 which telescopes with a pipe 33, around which is mounted a spider 34 which is mounted within the upper end of the pipe 29. The upper end of the pipe 33 extends upward within the funnel 31 and has detachably secured thereto by the coupling 9 a nozzle member 35 which may be straight as shown in the drawings or curved and flexible as shown in Figure 10, and provided with a nozzle 84 which may be constructed of any one of various shapes, such as having side and angle openings or provided with spinners, etc.

The two pipes 28 and 29 being telescoped together and carrying with them the pipes 32 and 33, may be raised and lowered with respect to the gear casing so that the nozzle and nozzle member 35 will enter through the drain hole 17 and the funnel 31 be in proper relation therewith and in such position the pipes 28 and 29 may be locked by the hand lever 37 in the usual manner.

To the base plate 10 is secured by the screws 40 an electrically operated induction heater, which forms the subject matter of an application for patent filed by me on October 6, 1933 under Serial No. 692,380, and which is not necessary to describe in detail herewith.

In general, this heater comprises a transformer 41 having a primary coil 42 and a secondary coil composed of a few turns or coils of pipe or tubing 43, all of which are mounted in a clamping plate 44 and the upper coil of the secondary 43 is carried upward and connected to the pump 59, while the lower coil 56 is also carried upward and is connected to the supply tank 67.

The several coils of the secondary tubular coil 43 are connected together in several places by metal strips 45 for the purpose of shortcircuiting the coil, and upon one side of said coil 43 is secured to and insulated therefrom a terminal plate 46 which carries the binding posts 47 and 48 and to which are connected the feed wires 85 and 86 that supply current to the primary coil 42. To another of the shorting strips 45 is mounted a plate 49 to which is secured and insulated therefrom the two terminal plates 50 and 51; the plate 50 being provided with an adjustable contact point 52 coacting with a contact point 53 mounted on one end of the thermostat bar 54 which is curved at its lower end and secured to the plate 49 by a post 55. The contact 53 on the bar 54 is connected by the pigtail wire 87 to the plate 51. The plates 50 and 51 are connected into the wiring circuit of the device by the wires 88 and 89.

The power compartment is formed between the deck 14 and the tank supporting ring 16. The electrical motor 57 is mounted on the deck 14 and is alined with an oil pump 59 also on the deck 14 and which is driven by the shaft 60 and universal coupling 61.

The intake side of the oil pump 59 is connected by a fitting 62 to the pipe 43, and the outlet side of the pump 59 is connected by the pipe 63 to the lower end of the pipe 32 by the fitting 64.

Also upon the deck 14 is mounted the electrical relay 65 and the combined fuse and switch box 66, the wiring of which is shown in Figure 7.

Upon the supporting ring 16 is mounted the oil tank 67 which is formed with an inclined bottom 68 sloping to a drain outlet provided with a spigot 69; while located back from the drain is placed an outlet fitting 70 which is connected by a pipe 71 to the lower pipe coil 56 of the heater, thus completing the circuit for the oil.

Within the tank 67 is mounted a perforated basket 72 to receive the thick grease from the spout 24 as it drops down through the pipes 28 and 29 from the funnel 31.

The switch box 66 is of the usual type and has the switch lever 76 and the cable plug 77 for the feed wire cable 92 which may be plugged into the usual electrical outlet.

Referring to Figure 7, it will be seen that the electrical supply current is led through the wires 92 to the switch 66 which is protected by the fuses 7 in the lines, and from the switch 66, one wire 91 leads to the motor 57 and from the motor 57 the wire 86 is connected to one side of the transformer coil 42 and to one terminal of the thermostat by the wire 89, the other terminal of the thermostat being connected by the wire 88 to the relay 65. The other terminal of the relay 65 is connected by the wire 90 to the motor 57 and switch 66. The other side of the transformer coil 42 is connected by the wire 85 to the armature of the relay 65.

In the operation of the device, the required quantity of cleansing fluid, such as flushing oil, kerosene, etc., having been placed in the supply tank 67 through the opening 26 in the top plate 18, and the service cable 92 having been connected to an electrical plug, the switch lever 76 is moved to the "on" position which closes the circuit to the motor 57 thus starting the rotation of the oil pump 59 to circulate the oil from the tank 67 through the heater coils 43.

At the same time electrical current is supplied to the primary coil 42 of the transformer 41 and due to inductance created in the shorted secondary tubular coil 43 this coil will heat the oil that is being pumped through the pipes 62, 63, 32, and 33 and the nozzle 35, into the interior of the gear casing in the form of a spray. This heater spray will heat the gear case and cause the old lubricant therein to melt, and mix with the spray and drain out through the funnel 31 and pipes 28 and 29 to the basket 72 where the larger pieces of sediment are held while the fluid enters the tank 67 and is conveyed back to the heater 43 by the pipe 71.

It is to be noted that the cleansing fluid first enters the gear casing at a temperature very little above amospheric temperature so as to gradually heat the casing and by returning to the heater this fluid's temperature is gradually built up, the increasing warmth causing the casing lubricant to become gradually liquid and to mix with the cleansing liquid of oil so that the entire contents of the casing become liquefied and are injected into the casing in the form of a divided or mulitple jet.

In the heating of the cleansing liquid and the lubricant it has been found that a temperature of about 160 degrees Fahrenheit is as high as it is advantageous to go. To prevent going over this degree of heat I have provided the heater coil 43 with a thermostat switch 54 which is set to operate at a predetermined degree of heat and actuate the relay to open the electrical circuit to the primary coil 42; the pump 59 still being operated to pump the oil, and as soon as the temperature has fallen to the proper degree, the thermostat 54 will again act to close the circuit to the primary coil 42; this action being repeated as often as necessary to maintain the temperature as desired.

Having thus described my invention, what I claim as new and desire to secure by Letters Patent, is:

1. In an apparatus for cleaning crank-cases through their drain openings, the combination with a tubular casing divided into an upper liquid storage and cleaning chamber, and a lower pumping and control chamber and having a liquid heater and a combined telescoping liquid injecting and draining device attached to the top of said casing and adapted to be adjusted in operative relation with the drain opening of the crank-case, of means for conveying the liquid from the storage chamber through the heater, means for forcing the heated liquid into the crank-case, means for conveying the liquid from the crank-case back to the liquid storage chamber, means for removing sediment and dirt from the liquid during its passage from the drain opening to the heater, and means for heating the liquid before each injection into the crank-case.

2. In an apparatus for cleaning crank-cases and the like through their drain opening, the combination with a casing divided transversely into a storage and cleaning chamber for liquid, and having a pumping and control chamber and a liquid heating chamber, a heater in said chamber a combined liquid injecting and draining device attached to said casing and adapted to be adjusted in operative relation with the drain opening of the crank-case, of means for conveying the liquid from the storage chamber to the heater and removing the sediment and dirt therefrom, a filtering device located in the storage chamber in the path of the liquid from the draining device and a pipe leading therefrom to the heater coils, and means for heating the liquid before each injection into the crank-case.

3. In an apparatus for cleaning crank-cases and the like through their drain opening, comprising a casing having a liquid storage chamber, a cleaning chamber, and a heater chamber, a combination injection and draining device located between the liquid storage chamber and the crank-case drain opening, means for conveying the liquid through the cleaning chamber and removing the sediment and dirt therefrom, of means for heating the liquid before each injection, comprising an electrical induction heater having a hollow secondary coil through which the liquid is passed to heat the same, and automatic means for controlling the degree of heat.

4. In an apparatus for cleaning and removing old lubricant from gear cases provided with a drain opening, of a tubular casing divided transversely into a cleaning fluid chamber, a power plant chamber, and a heater chamber, a cleaning fluid tank mounted in the liquid chamber and connected to the intake of an electrically operated tubular heater located in said heating chamber, a motor driven pump located in the power plant chamber and connected to the outlet of said heater, a drain pipe adapted to connect the drain opening of the gear casing to and convey the mixed liquid into said fluid tank, an injection service pipe mounted within the drain pipe, a connection between said service pipe and the outlet of said pump.

5. In an apparatus for cleaning crank-cases having drain openings, the combination of a cleaning fluid supply chamber, a power driven pump an electrically operated heater, and an adjustable tubular conductor interposed between the drain opening and the fluid supply tank for conducting by natural flow the fluid from the crank-case to the supply tank, of an injection pipe mounted within the tubular conductor, the upper end thereof provided with a nozzle adapted to be entered into the drain hole and the lower end connected to said pump, tubular connections between the heater and the fluid supply chambers, and means for heating the fluid before each injection.

6. In an apparatus for cleaning crank-cases having a drain opening, the combination with a cleaning fluid supply chamber, a power driven single one-way pump, an electrically operated heater, and an adjustable tubular conductor interposed between the drain opening and the fluid supply tank for conducting by natural flow the fluid from the crank-case to the fluid supply tank, of an injection pipe mounted within the tubular conductor, the upper end thereof provided with a nozzle adapted to enter the drain opening and the lower end connected to said pump, tubular connections between the pump and heater and between the heater and the fluid supply chamber, and means for heating the fluid before each injection.

7. In an apparatus for cleaning crank-cases through their drain openings, the combination of a tubular casing, transverse decks secured within said casing for dividing the same into an upper storage chamber for the cleaning liquid and adapted to receive the fluid and lubricant from the crank-case, a drainage device and inclined bottom formed therein and provided with a drain cock, an intermediate power chamber having a power driven pump, a lower heating chamber provided with a liquid heater, means for conveying liquid from the storage chamber to the heater, a tubular connection between the heater and the pump and a service line connecting the pump to the crank-case.

JAMES K. DELANO.